US009926956B2

(12) United States Patent
Horton et al.

(10) Patent No.: US 9,926,956 B2
(45) Date of Patent: Mar. 27, 2018

(54) DUAL PURPOSE CLAMP FOR SECURING AFTERTREATMENT HOUSING JOINTS

(71) Applicant: Cummins Emission Solutions Inc, Columbus, IN (US)

(72) Inventors: Bradley Horton, Columbus, IN (US); Thomas O. Roe, Stougton, WI (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 156 days.

(21) Appl. No.: 15/048,311

(22) Filed: Feb. 19, 2016

(65) Prior Publication Data

US 2017/0241455 A1 Aug. 24, 2017

(51) Int. Cl.

| | |
|---|---|
| ***B01D 50/00*** | (2006.01) |
| ***F16B 2/08*** | (2006.01) |
| ***F01N 3/20*** | (2006.01) |
| ***B01D 53/94*** | (2006.01) |
| ***F16B 2/06*** | (2006.01) |

(52) U.S. Cl.

CPC ............ *F16B 2/08* (2013.01); *B01D 53/9418* (2013.01); *F01N 3/2066* (2013.01); *F16B 2/065* (2013.01); *F01N 2450/20* (2013.01)

(58) Field of Classification Search

CPC ...... F01N 3/2066; F01N 2450/20; F01N 3/28; F01N 2450/02; F16B 2/08; F16B 2/065; B01D 53/9418

USPC .................. 422/171, 177, 180; 285/364, 365

See application file for complete search history.

(56) References Cited

U.S. PATENT DOCUMENTS

| | | |
|---|---|---|
| 1,959,630 A | 5/1934 | Julius |
| 1,977,241 A | 10/1934 | Parker |
| 2,269,664 A | 1/1942 | Hallerberg |
| 3,265,413 A | 8/1966 | Currie |
| 3,432,189 A | 3/1969 | Buller |
| 3,498,649 A | 3/1970 | Pfeuffer |
| 3,820,831 A | 6/1974 | Swedelius |

(Continued)

FOREIGN PATENT DOCUMENTS

| | | |
|---|---|---|
| FR | 2867511 | 9/2005 |
| FR | 2906864 | 4/2008 |

(Continued)

OTHER PUBLICATIONS

The International Search Report and Written Opinion issued in PCT/US2010/050771, dated Jun. 1, 2011.

*Primary Examiner* — Tom P Duong

(74) *Attorney, Agent, or Firm* — Foley & Lardner LLP

(57) ABSTRACT

An apparatus comprises a housing comprising a housing first portion and a housing second portion. The housing first portion comprises a first joint portion overlapping a second joint portion of the housing second portion so as to form a housing joint. A clamp is positioned on the housing joint and comprises a base portion. A first surface of the base portion is positioned on the housing joint. A plurality of legs extend from the base portion towards the housing each of which are spaced from each other around the housing joint. A plurality of flange segments extend from each side of the base portion away from the housing. A band is positioned on a second surface of the base portion opposite the first surface and around the clamp. The band is positioned between the plurality of flange segments and operatively coupled to the housing via the clamp.

25 Claims, 4 Drawing Sheets

100
132
130
A
112
110
120
118
114
116
Exhaust gas in
Exhaust gas Out
111
113
160
150
154
120
130
134

(56) References Cited

U.S. PATENT DOCUMENTS 3,865,413 A 2/1975 Mizusawa et al.
3,964,773 A 6/1976 Stade et al.
3,985,377 A 10/1976 Ahola et al.
4,163,535 A 8/1979 Austin
4,209,177 A 6/1980 Hall
4,482,303 A 11/1984 Acosta
4,557,441 A 12/1985 Aspinall
4,628,323 A 12/1986 Crean
4,676,717 A 6/1987 Willyard et al.
4,685,376 A 8/1987 Noel et al.
4,693,502 A 9/1987 Oetiker
4,832,380 A 5/1989 Oetiker
4,838,831 A * 6/1989 Rumberger .......... F16B 7/0406 403/338
5,031,410 A 7/1991 Plzak et al.
5,065,892 A 11/1991 Lukez
5,117,067 A 5/1992 Jaycox
5,201,222 A 4/1993 Johnson
5,433,070 A 7/1995 Amelio
5,505,498 A 4/1996 Halling et al.
5,549,449 A 8/1996 McInerney et al.
5,549,821 A 8/1996 Bounnakhom et al.
5,596,961 A 1/1997 Faber
5,621,617 A 4/1997 Goss et al.
5,661,976 A 9/1997 Clanton
5,662,292 A 9/1997 Greene et al.
5,791,888 A 8/1998 Smith
5,839,486 A 11/1998 Buesing
5,848,738 A 12/1998 Sundby et al.
5,913,665 A 6/1999 Sundby et al.
6,152,453 A 11/2000 Kashima et al.
6,152,578 A 11/2000 Hoffman et al.
6,164,067 A 12/2000 Cronje
6,325,550 B1 12/2001 Hoffman et al.
6,405,535 B1 6/2002 McEwan
6,568,554 B2 5/2003 Booth et al.
6,571,990 B2 6/2003 Bird
6,592,152 B1 7/2003 Nejigaki et al.
6,658,846 B1 12/2003 McEwan
6,726,738 B1 4/2004 Walker, Jr.
6,796,307 B1 9/2004 Hughson et al.
6,851,267 B2 2/2005 Bruno et al.
6,896,305 B1 5/2005 Wu et al.
7,013,651 B2 3/2006 Bruno et al.
7,040,957 B2 5/2006 Schultz et al.
7,172,202 B2 2/2007 Kubota et al.
7,178,341 B2 2/2007 Zborovsky et al.
7,249,790 B2 * 7/2007 Potts .................... F16L 21/005 285/367
7,393,020 B2 7/2008 Hartig et al.
7,469,689 B1 12/2008 Jones et al.
7,476,090 B2 1/2009 Wood
7,550,024 B2 6/2009 Pawson et al.
7,562,528 B2 7/2009 Wood
7,677,040 B2 3/2010 McEwan
7,893,365 B2 2/2011 Lewison
7,930,953 B2 4/2011 Frost
8,127,538 B2 3/2012 Pollitt et al.
8,191,356 B2 6/2012 Pollitt et al.
8,246,709 B2 * 8/2012 Franken ............. F01N 13/1805 285/406
8,256,060 B2 9/2012 Wagner et al.
8,327,829 B2 12/2012 Keidel et al.
8,328,243 B2 12/2012 Matthis et al.
8,347,908 B2 1/2013 Golecki et al.
8,544,267 B2 10/2013 Danielewicz et al.
8,657,255 B2 2/2014 Goodman et al.
8,695,327 B2 4/2014 Pollitt et al.
8,857,178 B2 10/2014 O'Hara
2004/0075276 A1 * 4/2004 Lemke ............... F01N 13/1805 285/367
2006/0082154 A1 4/2006 Hartig et al.
2006/0191247 A1 * 8/2006 Thaler ................. B01D 46/001 55/523
2006/0202480 A1 * 9/2006 Cassel ................ F01N 13/1805 285/408
2008/0277016 A1 11/2008 Covers et al.
2010/0187771 A1 7/2010 Waltenberg et al.
2011/0074150 A1 3/2011 Drost et al.

FOREIGN PATENT DOCUMENTS

JP 09-133276 5/1997
JP 2006-009914 1/2006
KR 10-0776367 11/2007
KR 10-0904419 6/2009

* cited by examiner 220
221
221
130
226
222
223
224
225
110

321
320
130
112
326
323
322
324
325

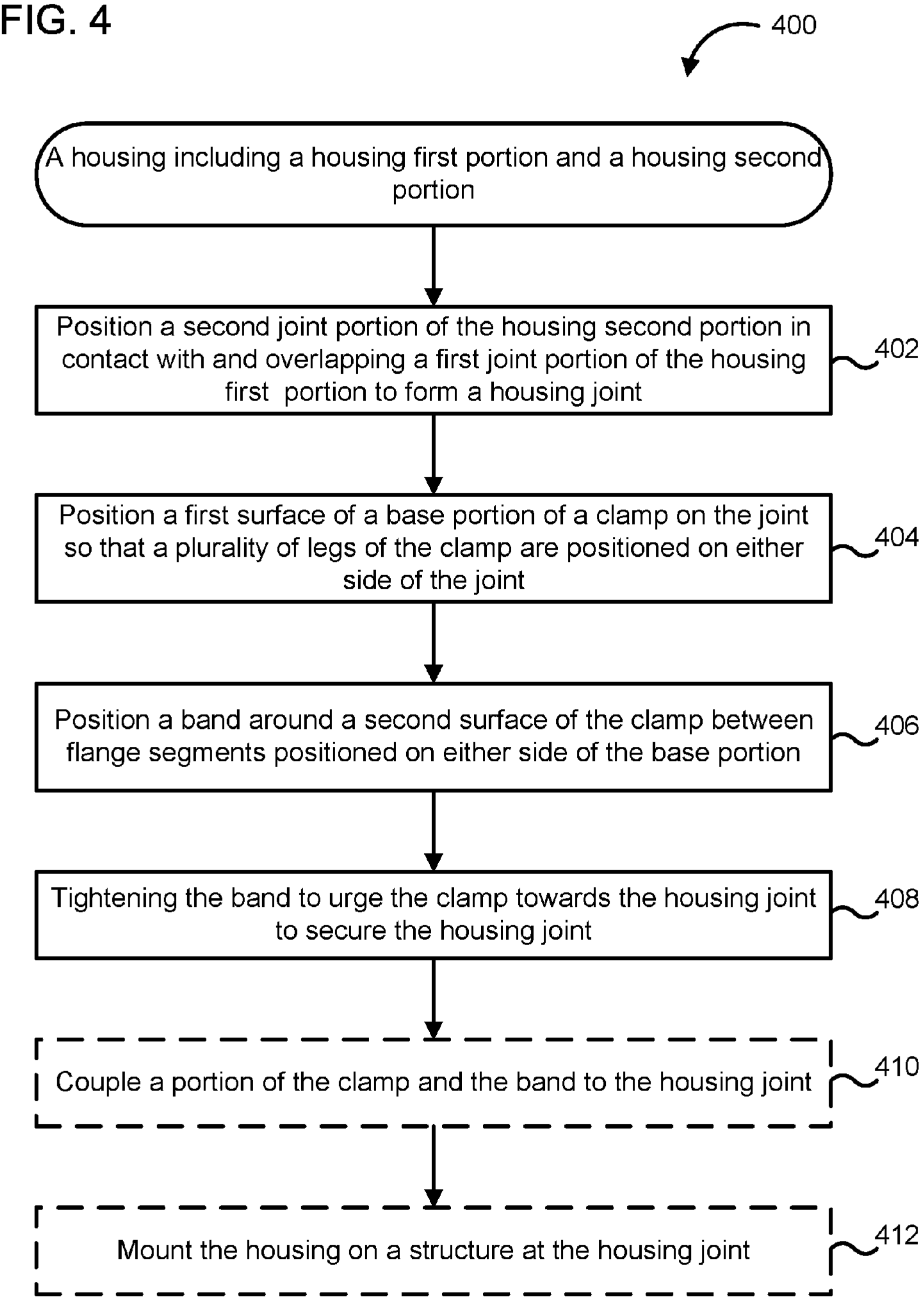
FIG. 4
400
A housing including a housing first portion and a housing second portion
Position a second joint portion of the housing second portion in contact with and overlapping a first joint portion of the housing first portion to form a housing joint
402
Position a first surface of a base portion of a clamp on the joint so that a plurality of legs of the clamp are positioned on either side of the joint
404
Position a band around a second surface of the clamp between flange segments positioned on either side of the base portion
406
Tightening the band to urge the clamp towards the housing joint to secure the housing joint
408
Couple a portion of the clamp and the band to the housing joint
410
Mount the housing on a structure at the housing joint
412

DUAL PURPOSE CLAMP FOR SECURING AFTERTREATMENT HOUSING JOINTS

TECHNICAL FIELD

The present disclosure relates generally to aftertreatment systems for use with internal combustion (IC) engines.

BACKGROUND

Exhaust aftertreatment systems are used to receive and treat exhaust gas generated by engines such as IC engines. Conventional exhaust gas aftertreatment systems comprise any of several different components to reduce the levels of harmful exhaust emissions present in exhaust gas. For example, certain exhaust aftertreatment systems for diesel-powered IC engines comprise a selective catalytic reduction (SCR) catalyst to convert NOx (NO and $NO_2$ in some fraction) into harmless nitrogen gas ($N_2$) and water vapor ($H_2O$) in the presence of ammonia ($NH_3$).

Aftertreatment systems generally comprise a plurality of components which are positioned within a housing of the aftertreatment system. Each of the plurality of components can comprise separate modules having their own housing which may be coupled together to assemble the aftertreatment system. The housings of each of the plurality of components are coupled together at service joints to assemble the aftertreatment system.

Mounting assemblies are generally used to mount such aftertreatment systems on a structure, for example a vehicle chassis. Such mounting assemblies are generally coupled to the aftertreatment system at locations which are different than the service joints. Thus, a substantial surface of the housing of the aftertreatment system is occupied by the clamps and the mounting members, reducing the space available for mounting other components on the surface of the housing of the aftertreatment system and increasing costs.

SUMMARY

Embodiments described herein relate generally to systems and methods for securing aftertreatment housing joints. Particular embodiments described herein relate to clamps that may comprise a V-shaped portion structured to be positioned around a housing joint of a housing of an aftertreatment system. The clamps may further comprise flange segments extending away from the housing and structured to secure a band positioned therebetween. The aftertreatment housing may be mounted at the housing joint via the band so as to allow more space to be available for mounting aftertreatment system accessories on the housing, minimize overall aftertreatment system length, and/or allow for improved insulation mechanisms, thereby improving thermal management.

In a first set of embodiments, an apparatus comprises a housing comprising a housing first portion and a housing second portion. The housing first portion comprises a first joint portion overlapping a second joint portion of the housing second portion so as to form a housing joint. A clamp is positioned on the housing joint. The clamp comprises a base portion. A first surface of the base portion is positioned on the housing joint. A plurality of legs extend from the base portion towards the housing. Each of the plurality of legs are spaced from each other around the housing joint. A plurality of flange segments extend from each side of the base portion away from the housing. A band is positioned on a second surface of the base portion opposite the first surface and around the clamp. The band is positioned between the plurality of flange segments and operatively coupled to the housing via the clamp.

In another set of embodiments, an aftertreatment system comprises a housing comprising a housing first portion and a housing second portion. The housing first portion comprises a first joint portion overlapping a second joint portion of the housing second portion so as to form a housing joint. A first aftertreatment component is positioned within a first internal volume defined by the housing first portion. A clamp is positioned on the housing joint. The clamp comprises a base portion. A first surface of the base portion is positioned on the housing joint. A plurality of legs extend from the base portion towards the housing. The plurality of legs are spaced from each other around the housing joint. A plurality of flange segments extend from each side of the base portion away from the housing. A band is positioned on a second surface of the base portion opposite the first surface and around the clamp. The band is positioned between the plurality of flange segments and operatively coupled to the housing via the clamp.

In yet another set of embodiments, a method of securing a band positioned on a housing joint of a housing which comprises a housing first portion comprising a first joint portion and a housing second portion comprising a second joint portion, comprises positioning the second joint portion of the housing second portion in contact with and overlapping at least a portion of the first joint portion of the housing first portion, thereby forming a housing joint. A clamp is positioned on the housing joint. The clamp comprises a base portion comprising a first surface and a second surface opposite the first surface. A plurality of legs extend from the base portion towards the housing. A plurality of flange segments extend from each side of the second surface of the base portion away from the housing. The positioning comprises positioning the first surface of the clamp on the housing joint so as to cause the plurality of legs to be spaced from each other around the housing joint. The band is positioned on the second surface around the clamp between the plurality of flange segments. The band is secured around the clamp.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 4 is a schematic flow diagram of an example method for securing a housing joint of a housing of an aftertreatment system and a band positioned thereon.

Figure 1:
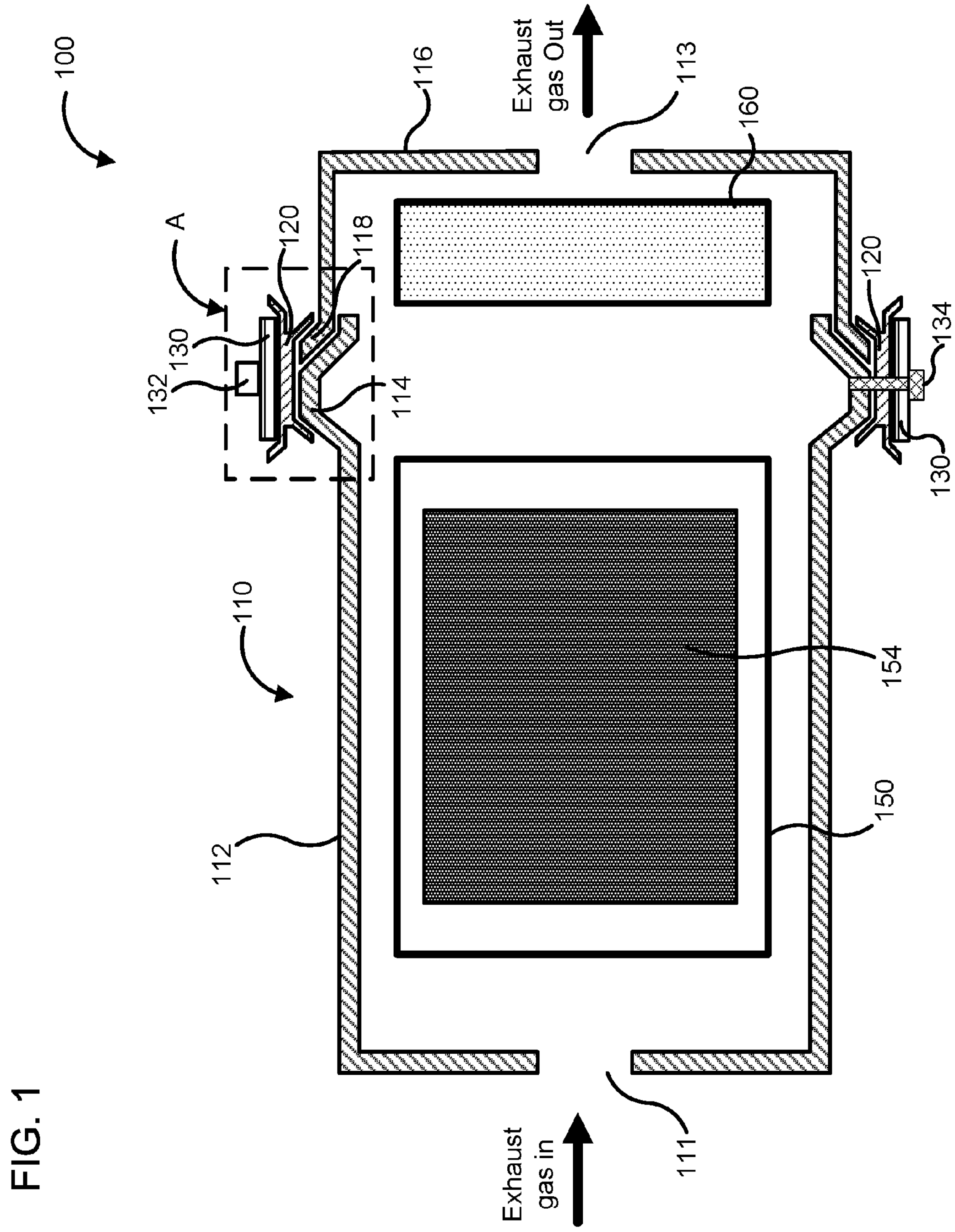
FIG. 1 is a side cross-section of an aftertreatment system according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for securing aftertreatment housing joints. In particular, embodiments described herein relate to clamps that may comprise a V-shaped portion structured to be positioned around a housing joint of a housing of an aftertreatment system. The clamps may further comprise flange segments extending away from the housing and structured to secure a band positioned therebetween. The aftertreatment housing may be mounted at the housing joint via the band so as to allow more space to be available for mounting aftertreatment system accessories on the housing, minimize or otherwise significantly reduce overall aftertreatment system length, allow for improved insulation mechanisms, thereby improving thermal management, and/or facilitate or make it easier to install the aftertreatment system on a structure, for example a chassis of a vehicle.

Aftertreatment systems generally comprise a plurality of components which are positioned within a housing of the aftertreatment system. Each of the plurality of components may comprise separate modules having their own respective housings which may be coupled together to assemble the aftertreatment system. The housings of each of the plurality of components may be coupled together at service joints to assemble the aftertreatment system. The service joints represent mechanically weak areas which may be fixedly or removably secured.

Mounting assemblies are generally used to mount such aftertreatment systems on a structure, for example a vehicle chassis. Such mounting assemblies are generally coupled to the aftertreatment system at locations which are different than the service joints. This may be due to curved or non-planar surface the housing joint which may make it difficult to position and secure a band thereon. Thus, a substantial surface of the housing of the aftertreatment system is occupied by the clamps and the mounting members, reducing the space available for mounting other components on the surface of the housing of the aftertreatment system and increasing costs.

Embodiments described herein may provide benefits including, for example: (1) providing a clamp capable of securing housing joints of a housing of an aftertreatment system while allowing a suitable surface for positioning a band thereon; (2) allowing mounting of a housing of an aftertreatment system to a structure at the housing joints (also referred to herein as "service joints"), which may be preferable mounting locations for mounting the housing of the aftertreatment system; (3) allowing more space to be available on the housing for positioning various aftertreatment components such as sensors, controllers, electrical leads, fluid conduits, etc. on the housing; (4) reducing overall length of the aftertreatment housing and, thereby the aftertreatment system; (5) improving thermal management; and (6) facilitate or make it easier to install the aftertreatment system on a structure, for example a chassis of a vehicle.

FIG. 1 is a schematic illustration of a side cross section of an aftertreatment system 100 according to an embodiment. The aftertreatment system 100 comprises a housing 110, a clamp 120, a band 130, a first aftertreatment component 150 and optionally a second aftertreatment component 160. The aftertreatment system 100 is configured to receive an exhaust gas (e.g., a diesel exhaust gas) from an IC engine (e.g., a diesel IC engine) and decompose, capture and/or neutralize constituents (e.g., NOx gases, carbon monoxide, hydrocarbons, ammonia, particulate matter, etc.) of the exhaust gas.

The housing 110 comprises a housing first portion 112 and a housing second portion 116. The housing first portion 112 is positioned upstream of the housing second portion 116. The housing first portion 112 comprises an inlet 111 for receiving the exhaust gas. The housing first portion 112 defines a first internal volume. The first aftertreatment component 150 may be positioned within the first internal volume. The housing 110 may have any suitable shape or size and have any suitable cross-section. For example, the housing 110 may comprise a cylindrical housing having a circular, rectangular, square, elliptical, polygonal, or any other suitable cross-section.

In various embodiments, the first aftertreatment component 150 may comprise a SCR system In such embodiments, the first aftertreatment component 150 may comprise at least one catalyst 154 formulated to selectively reduce constituents (e.g., NOx gases) of the exhaust gas flowing the through the aftertreatment system 100 (e.g., a diesel exhaust gas). Any suitable catalyst may be used such as, for example, platinum, palladium, rhodium, cerium, iron, manganese, copper, vanadium based catalyst, any other suitable catalyst, or a combination thereof. In other embodiments, the first aftertreatment component 150 may comprise any other component, for example an oxidation catalyst (e.g. a carbon monoxide (CO), hydrocarbon or ammonia oxidation catalyst), a particulate filter (e.g., a diesel particulate filter, a catalyzed filter or a partial filter), a mixer, baffles and/or any other aftertreatment component.

The housing second portion 116 is positioned downstream of the housing first portion 112 and comprises an outlet 113 for expelling treated exhaust gas into the environment. The housing second portion 116 defines a second internal volume within which the second aftertreatment component 160 may be positioned. The second aftertreatment component 160 may comprise an oxidation catalyst (e.g. a CO, hydrocarbon or ammonia), a particulate filter (e.g., a diesel particulate filter, a catalyzed filter or a partial filter), an SCR system, a mixer, baffles and/or any other aftertreatment component.

The housing second portion 116 is coupled to the housing first portion 112 at a housing joint. Expanding further, the housing first portion 112 comprises a first joint portion 114 which may overlap (e.g., at least partially overlap) a second joint portion 118 of the housing second portion 116 so as to form the housing joint. For example, the first joint portion 114 of housing first portion 112 may comprise a bead (e.g., a ridge, a bump or a protrusion) protruding outwards from the housing first portion 112. Furthermore, the second joint portion of the housing second portion 116 may comprise a flare (e.g., a bent edge) structured to overlap at least a portion of the bead formed by the first joint portion.

In other embodiments, a first cross-section (e.g., diameter) of the housing first portion 112 at the first joint portion 114 may be slightly larger than a second cross-section (e.g., diameter) of the housing second portion 116 at the second joint portion 118. This may allow the first joint portion 114 to be positioned over and around the second joint portion 118 to couple the housing first portion 112 to the housing second portion 116. In particular embodiments, the first cross-section and the second cross-section may be within close tolerance of each other so that the first joint portion 114 and the second joint portion 118 may form a friction fit.

Figure 2:
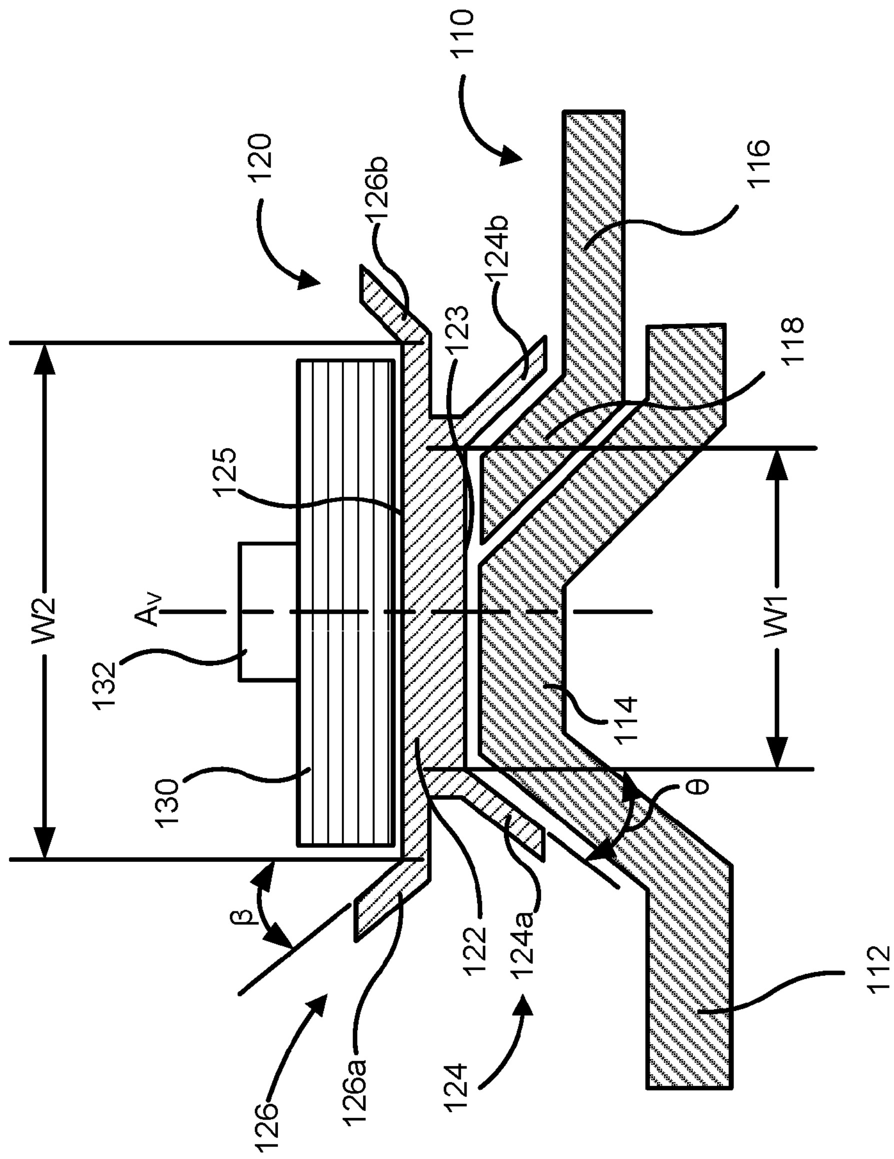
FIG. 2 is an enlarged view of a portion of the aftertreatment system of FIG. 1 indicated by the arrow A in FIG. 1.

A clamp 120 is positioned on the housing joint. The clamp 120 may be curved or have a clamp curvature corresponding to a curvature defined by the housing 110 (e.g., a circular housing) so as to conform thereto. As shown in FIG. 2, the clamp 120 comprises a base portion 122 having a first surface 123 positioned on the housing joint. A plurality of legs 124 extend from the base portion 122 towards the housing 110. The plurality of legs 124 may be spaced from each other around the housing joint.

For example, and as shown in FIG. 2, the plurality of legs 124 comprise a first leg 124*a* and a second leg 124*b*. The base portion 122 may have a first width W1 corresponding to a width of the housing joint (e.g., in close tolerance with or slightly larger than the width of the housing joint). The first leg 124*a* may be oriented at a first angle θ with respect to a vertical axis $A_V$ of the housing joint away from the housing joint. The first angle θ may correspond to a first inclination angle of a sidewall of the bead formed by the first joint portion 114. The first angle θ may be in the range of 10 degrees to 60 degrees (e.g., 10, 20, 30, 40, 50 or 60 degree inclusive of all ranges and values therebetween).

Similarly, the second leg 124*b* may also be oriented an opposite angle to the first leg 124*a* so as to correspond to a second inclination angle of the flare formed by the housing second portion 118. For example, the second leg may be oriented at an angle in the range of −10 degrees to −60 degrees with respect to the vertical axis $A_V$ (e.g. −10, −20, −30, −40, −50 or −60 degrees inclusive of all ranges and values therebetween). The base portion 122 and the plurality of legs 124 may therefore, form a V-shaped portion of the clamp 120.

The first leg 124*a* may be positioned on a first side of the bead 114 of the housing first portion 112 so as to abut at least a portion of the bead 114. The second leg 124*b* may be positioned on a second side of the flare 118 so as to abut at least a portion of the flare 118. The first leg 124*a* and the second leg 124*a* may apply an inward force on the bead 114 and the flare 118 so as to urge the bead 114 and the flare 118 towards each other, thereby securing the housing joint.

The clamp 120 also comprises a plurality of flange segments 126 extending from each side of the base portion 122 away from the housing 110. For example, the clamp 120 comprises a first flange segment 126*a* and a second flange segment 126*b* positioned on opposite ends of the base portion 122 so as to extend away from the housing 110. Each of the plurality of flange segments 126 extend at an angle θ relative to the vertical axis $A_V$ of the housing joint away from the housing 110. For example, the plurality of flange segments 126 may extend at angle in the range of 30 degrees to 110 degrees away from the housing 110. In other words, the flange segments 126 may bend away from the vertical axis $A_V$, towards the vertical axis $A_V$ or perpendicular to the base portion 122 (e.g., oriented at angle of 90 degrees relative to the base portion 122 and positioned parallel to the vertical axis $A_V$) away from the housing 110.

The band 130 is positioned on the second surface 125 of the housing 110 which is opposite the first surface 123 of the clamp 120. The band 130 is positioned between the flange segments 126 and operatively coupled to the housing 110 via the clamp 120. The band 130 may be configured to mount the aftertreatment system to a structure (e.g., a vehicle chassis). The band 130 can be formed from any suitable material, for example metals, fabric or polymers. In various embodiments, the band 130 may comprise a strap having a first end and a second end. The band 130 may be wrapped around the second surface 125 of the clamp 120 such that the first end and the second end of the band 130 overlap.

A second width W2 between the flange segments 126 may correspond to a width of the band 130. For example, the second width W2 between the flange segments 126 may be about the same width (e.g., be within +5% or +10% of the width of the band 130 including all ranges and values therebetween) so that band maybe positioned on the second surface 125 between the flange segments 126 with close tolerance.

In other embodiments, the second width W2 between the flange segments 126 may be significantly wider than a width of the band 130 (e.g., in the range of +50% or +100% of the width of the band 130 including all ranges and values therebetween). The wider spacer between the flange segments 126 relative to the width of the band may provide flexibility in positioning the band 130 on the second surface 125 of the clamp 120. Furthermore, the wider space between the flange segments 126 may allow the band 130 to slide between the flange segments 126, for example to accommodate expansion/contraction of the housing 110 and/or vibrations. In various embodiments, the second width W2 between the flange segments 126 may be greater than the first width W1 between the plurality of legs 124.

The second surface 125 may provide a relatively flat surface for positioning the band 130 thereon. Furthermore, the first flange segment 126*a* and the second flange segment 126*b* may prevent the band 130 from sliding of the second surface 125 of the clamp 120. In this manner, the band 130 may be securely positioned on the housing joint. Furthermore, the band 130 may be used to mount the housing 110 on to a structure (e.g., a frame or chassis of a vehicle) at the housing joint, thereby allowing more space to be available on the housing 110 to mount various accessories of the aftertreatment system 100, for example sensors, controllers, fluid conduits, electrical leads, reductant injectors, etc.

A winch 132 may be operatively coupled to at least a first portion of the band 130. The winch 132 may be structured to urge the first end of the band 130 towards the second end of the band so as to reduce a circumference of the band 130. This secures the band 130 to the clamp 120. The winch 132 may comprise any suitable tightening mechanism such as a nut and lead screw, a rack and pinion, a ratchet and/or any other tightening mechanism.

In some embodiments, a second portion of the band 130 and at least a portion of the clamp 120 may be secured to at least a portion of the housing joint via a fastener 134. For example, FIG. 1 shows the fastener 134 (e.g., a screw, a nut, a bolt, a rivet, a pin, etc.) inserted through the second portion of the band 130, a portion of the clamp 120 and into the bead 114 of the housing first portion 112 so as to secure the second portion of the band 130 and the portion of the clamp 120 to the housing joint. Securing the second portion of the band 130 and the portion of the clamp 120 to the housing joint may facilitate positioning of the clamp 120 and/or the band 130 around the housing joint.

Figure 3A:
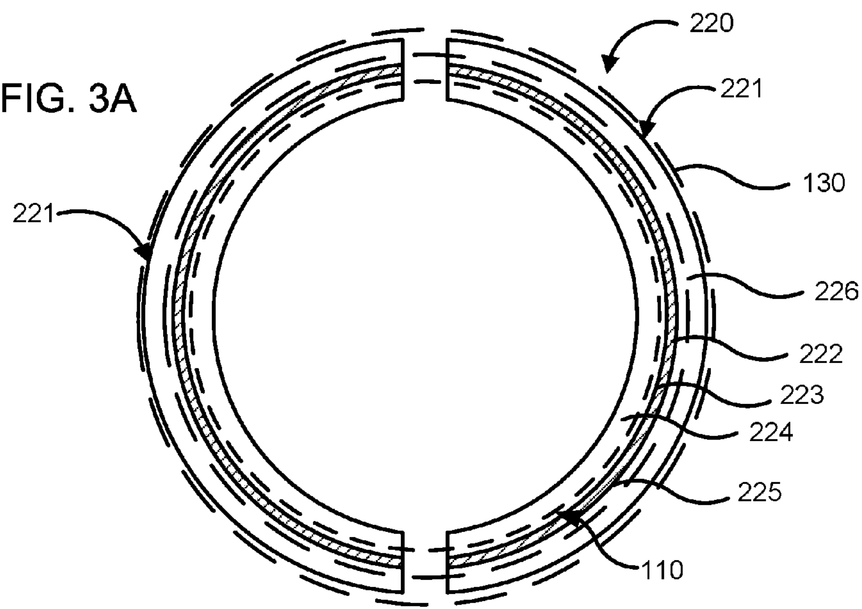
FIG. 3A is a schematic illustration of an embodiment of a clamp that may be used to secure a housing joint of a housing of an aftertreatment system and a band positioned thereon.

In various embodiments, the clamp 120 or any other clamp described herein may comprise a plurality of clamp segments structured to be positioned around at least a portion of the housing joint. For example, FIG. 3A is a side cross-section of a clamp 220 for securing a housing joint. The clamp 220 comprises a pair of semi-circular clamps segments 221 structured to conform to a curvature of the housing 110 (e.g., a housing having a circular cross-section).

Each clamp segment 221 is positionable around a portion of the housing joint of the housing 110 (represented by short-dashed lines in FIG. 3A) or any other housing described herein such that a first surface 223 of a base portion 222 of each clamp segment 221 may be positioned on a housing joint of the housing 110. A plurality of legs 224 (e.g., a first leg and a second leg) extend from the base portion 222 of each clamp segment 221 towards the housing 110 and are spaced from each other around the housing joint when the clamp 220 is positioned on the housing joint.

Furthermore, the band 130 (represented by long-dashed lines in FIG. 3A) or any other band described herein may be positioned on a second surface 225 of the base portion 222 opposite the first surface 223 of each of the clamp segments 221 and is operatively coupled to the housing 110 via the clamp 220. The band 130 may secure each of the pair of clamp segments 221 on the housing joint.

A plurality of flange segments 226 (e.g., a first flange segment and a second flange segment) extend from each side of the base portion 222 away from the housing 110. The band 130 is positioned between the plurality of flange segments 226 on the second surface 225. The plurality of flange segments 226 prevent the band 130 from sliding of the clamp 220, thereby securing the band 130 on the housing joint.

Figure 3B:
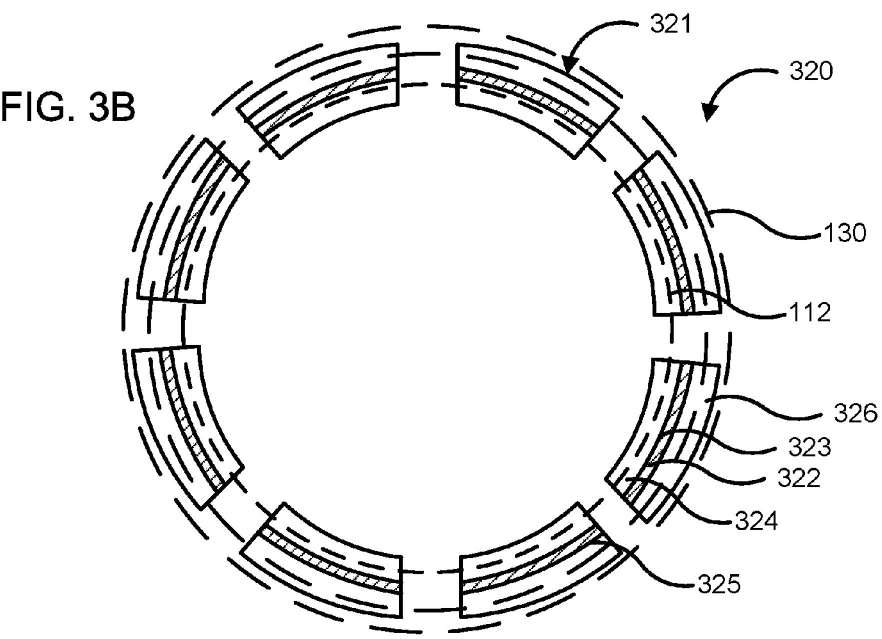
FIG. 3B is a schematic illustration of another embodiment of a clamp that may be used to secure a housing joint of a housing of an aftertreatment system and a band positioned thereon.

FIG. 3B is a side cross-section of another clamp 320. The clamp 320 may comprise a plurality of curved clamp segments 321. Each of the plurality of clamp segments 321 have a clamp segment curvature corresponding to a curvature of the housing 110. Each clamp segment 321 is positionable around a portion of the housing joint of the housing 110 (represented by short-dashed lines in FIG. 3A) or any other housing described herein such that a first surface 323 of a base portion 322 of each of the plurality of clamp segments 321 may be positioned on a housing joint of the housing 110. A plurality of legs 324 (e.g., a first leg and a second leg) extend from the base portion 322 of each clamp segment 321 towards the housing 110 and are spaced from each other around the housing joint when the clamp 320 is positioned on the housing joint.

Furthermore, the band 130 or any other band described herein may be positioned on a second surface 325 of the base portion 322 opposite the first surface 323 of each of the plurality of clamp segments 321 and be operatively coupled to the housing 110 via the plurality of clamp segments 321 of the clamp 320. The band 130 may secure each of the plurality of clamp segments 321 on the housing joint.

A plurality of flange segments 326 (e.g., a first flange segment and a second flange segment) extend from each side of the base portion 322 of each of the plurality of clamp segments 321 away from the housing 110. The band 130 is positioned between the plurality of flange segments 326 on the second surface 325. The plurality of flange segments 326 prevent the band 130 from sliding of the clamp 320, thereby securing the band 130 on the housing joint.

FIG. 4 is a schematic flow diagram of an example method 400 for securing a band (e.g., the band 130) on a housing joint of a housing (e.g., the housing 110) which comprises a housing first portion (e.g., the housing first portion 112) comprising a first joint portion (e.g., the first joint portion 114). The housing further comprises a housing second portion (e.g., the housing second portion 116) which comprises a second joint portion (e.g., the second joint portion 118).

The method comprises positioning the second joint portion of the housing second portion in contact with and overlapping at least a portion of the first joint portion of the housing first portion, thereby forming a housing joint at 402. For example, the second joint portion 118 of the housing second portion 116 (e.g., a flared portion) may be positioned in contact with at least a portion of the first joint portion 114 (e.g., a sidewall of the bead 114) of the housing first portion 112 so as to form the housing joint.

A clamp is positioned on the housing joint at 404. The clamp (e.g., the clamp 120/220/320) comprises a base portion (e.g., the base portion 122/222/322) comprising a first surface (e.g., the first surface 123/223/323) and a second surface (e.g., the second surface 125/225/325) opposite the first surface. A plurality of legs (e.g., the plurality of legs 124/224/324) may extend from the base portion towards the housing. Furthermore, a plurality of flange segments (e.g., the flange segments 126/226/326) may extend from the base portion (e.g., the base portion 122/222/322) away from the housing.

The positioning of the clamp (e.g., the claim 120/220/320) comprises positioning the first surface of clamp on the housing joint so as to cause the plurality of legs (e.g., the plurality of legs 124/224/224) to be spaced from each other around the housing joint. For example, a first leg (e.g., the first leg 124*a*) of the plurality of legs (e.g., the plurality of legs 124/224/324) may be positioned so as to abut at least a portion of a bead formed by the first joint portion (e.g., the first joint portion 114), and a second leg (e.g., the second leg 124*b*) of the plurality of legs may be positioned so as to abut at least a portion of a flare formed by the second joint portion (e.g., the second joint portion 118).

The band is positioned on the second surface around the clamp between the plurality of flange segments at 406. For example, the band 130 is positioned on the second surface 125/225/325 of the clamp 120/220/320. The plurality of flange segments 126/226/326 of the clamp 120/220/320 may prevent the band 130 from sliding off the second surface 125/225/325 of the clamp 120/220/320, as described before herein. In various embodiments, the plurality of flange segments 126/226/326 (e.g., the first flange segment 126*a* and the second flange segment 126*b*) may extend from the base portion at an angle in the range of 30 degrees to 110 degrees, a described before herein.

In some embodiments, the method 400 may also comprise coupling a portion of the clamp and the band to the housing at 410. For example, a portion of the clamp 120 and a second portion of the band 130 are coupled to the housing joint (e.g., the first joint portion 114 of the housing first portion 112 which comprises a bead) via a fastener such as a screw, a nut, a bolt, a rivet, a pin or any other suitable fastener.

In some embodiments, the method 400 may also comprise mounting the housing to a structure at the housing joints at 412. For example, the housing 110 or any other housing described herein may be mounted on a structure (e.g., a frame or chassis of a vehicle) by removably coupling the band 130 to the structure via mounting members, for example brackets, fasteners such as the fastener 134 (e.g., nuts, screws, bolts, pins, etc.) or any other suitable method. In this manner, the housing 110 may be mounted to the structure at the housing joints such that the remaining space on the housing 110 is available for positioning various accessories of the aftertreatment system 100, as described herein.

It should be noted that the term "example" is used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An apparatus, comprising;

a housing comprising a housing first portion and a housing second portion, the housing first portion comprising a first joint portion overlapping a second joint portion of the housing second portion so as to form a housing joint;

a clamp positioned on the housing joint, the clamp comprising:

a base portion, a first surface of the base portion positioned on the housing joint, a plurality of legs extending from the base portion towards the housing, each of the plurality of legs spaced from each other around the housing joint, and a plurality of flange segments extending from each side of the base portion away from the housing; and a band positioned on a second surface of the base portion opposite the first surface and around the clamp, the band positioned between the plurality of flange segments, the band operatively coupled to the housing via the clamp.

2. The apparatus of claim 1, wherein the plurality of flange segments comprise a first flange segment and a second flange segment positioned on opposite ends of the base portion, the band positioned between the first flange segment and the second flange segment on the second surface, the first flange segment and the second flange segment preventing the band from sliding off the clamp.

3. The apparatus of claim 2, wherein the first flange segment and the second flange segment extend from the base portion at an angle in a range of 30 degrees to 110 degrees inclusive.

4. The apparatus of claim 1, further comprising;

a winch operatively coupled to the band, the winch configured to secure the band around the clamp.

5. The apparatus of claim 1, wherein the first joint portion comprises a bead and the second joint portion comprises a flare, the flare overlapping at least a portion of the bead.

6. The apparatus of claim 5, wherein each of the plurality of legs of the clamp comprise a first leg and a second leg, the first leg abutting at least a portion of the bead and the second leg abutting at least a portion of the flare.

7. The apparatus of claim 1, wherein a first spacing between the plurality of flange segments is greater than a second spacing between the plurality of legs.

8. The apparatus of claim 1, wherein the clamp comprises a plurality of clamp segments, each of the plurality of clamp segments positioned around at least a portion of the housing joint.

9. The apparatus of claim 8, wherein the housing comprises a cylindrical housing defining a circular cross-section.

10. The apparatus of claim 9, wherein the plurality of clamp segments are curved so as to conform to a curvature defined by the cylindrical housing.

11. An aftertreatment system, comprising;

a housing comprising a housing first portion and a housing second portion, the housing first portion comprising a first joint portion overlapping a second joint portion of the housing second portion so as to form a housing joint;

a first aftertreatment component positioned within a first internal volume defined by the housing first portion;

a clamp positioned on the housing joint, the clamp comprising:

a base portion, a first surface of the base portion positioned on the housing joint, a plurality of legs extending from the base portion towards the housing, the plurality of legs spaced from each other around the housing joint, and a plurality of flange segments extending from each side of the base portion away from the housing; and a band positioned on a second surface of the base portion opposite the first surface and around the clamp, the band positioned between the plurality of flange segments, the band operatively coupled to the housing via the clamp.

12. The aftertreatment system of claim 11, wherein a second aftertreatment component is positioned within a second internal volume defined by the housing second portion.

13. The aftertreatment system of claim 12, wherein at least one of the first aftertreatment component and the second aftertreatment component comprises a selective catalytic reduction system.

14. The aftertreatment system of claim 11, wherein the plurality of flange segments comprise a first flange segment and a second flange segment positioned on opposite ends of the base portion, the band positioned between the first flange segment and the second flange segment on the second surface, the first flange segment and the second flange segment preventing the band from sliding off the clamp.

15. The aftertreatment system of claim 14, wherein the first flange segment and the second flange segment extend from the base portion at an angle in a range of 30 degrees to 110 degrees inclusive.

16. The aftertreatment system of claim 11, wherein the first joint portion comprises a bead and the second joint portion comprises a flare, the flare overlapping at least a portion of the bead.

17. The aftertreatment system of claim 16, wherein each of the plurality of legs of the clamp comprise a first leg and a second leg, the first leg abutting at least a portion of the bead and the second leg abutting at least a portion of the flare.

18. The aftertreatment system of claim 11, wherein the clamp comprises a plurality of clamp segments, each of the plurality of clamp segments positioned around at least a portion of the housing joint.

19. The aftertreatment system of claim 18, wherein the housing comprises a cylindrical housing defining a circular cross-section.

20. The aftertreatment system of claim 19, wherein the plurality of clamp segments are curved so as to conform to a curvature defined by the cylindrical housing.

21. A method of securing a band positioned on a housing joint of a housing, the housing comprising a housing first portion comprising a first joint portion and a housing second portion comprising a second joint portion, the method comprising:

positioning the second joint portion of the housing second portion in contact with and overlapping at least a portion of the first joint portion of the housing first portion, thereby forming a housing joint, positioning a clamp on the housing joint, the clamp comprising a base portion comprising a first surface and a second surface opposite the first surface, a plurality of legs extending from the base portion towards the housing, and a plurality of flange segments extending from each side of the second surface of the base portion away from the housing, the positioning comprising positioning the first surface of the clamp on the housing joint so as to cause the plurality of legs to be spaced from each other around the housing joint;

positioning the band on the second surface around the clamp between the plurality of flange segments; and securing the band around the clamp.

22. The method of claim 21, wherein the plurality of flange segments comprise a first flange segment and a second flange segment positioned on opposite ends of the base portion, the first flange segment and the second flange segment preventing the band from sliding off the clamp.

23. The method of claim 22, wherein the first flange segment and the second flange segment extend from the base portion at an angle in a range of 30 degrees to 110 degrees inclusive.

24. The method of claim 21, wherein the first joint portion comprises a bead and the second joint portion comprises a flare.

25. The method of claim 24, wherein each of the plurality of legs of the clamp comprise a first leg and a second leg, the first leg abutting at least a portion of the bead and the second leg abutting at least a portion of the flare.

* * * * *